United States Patent
Kaplan

[11] Patent Number: 5,937,055
[45] Date of Patent: Aug. 10, 1999

[54] METHOD AND APPARATUS FOR ROUTING TELEPHONE CALLS BETWEEN ALTERNATE TELEPHONE SERVICE PROVIDERS

[75] Inventor: Alan Edward Kaplan, Morristown, N.J.

[73] Assignee: Lucent Technologies Inc., Murray Hill, N.J.

[21] Appl. No.: 08/789,571

[22] Filed: Jan. 28, 1997

[51] Int. Cl.[6] .................................................. H04M 3/42
[52] U.S. Cl. ........................................... 379/221; 379/201
[58] Field of Search ................................... 379/201, 207, 379/211, 219, 220, 221, 286, 265

[56] References Cited

U.S. PATENT DOCUMENTS

| | | | |
|---|---|---|---|
| 4,555,594 | 11/1985 | Friedes et al. | 379/235 |
| 4,565,903 | 1/1986 | Riley | 379/220 |
| 4,577,066 | 3/1986 | Bimonte et al. | 379/221 |
| 4,866,763 | 9/1989 | Cooper et al. | 379/201 |
| 5,309,504 | 5/1994 | Morganstein | 379/265 |
| 5,309,505 | 5/1994 | Szlam et al. | 379/265 |
| 5,341,415 | 8/1994 | Baran | 379/201 |
| 5,422,945 | 6/1995 | Wyatt | 379/283 |
| 5,515,427 | 5/1996 | Carlsen et al. | 379/220 |
| 5,550,910 | 8/1996 | DeJager | 379/220 |
| 5,563,938 | 10/1996 | Soshea et al. | 379/201 |
| 5,563,939 | 10/1996 | La Porta et al. | 379/201 |
| 5,655,014 | 8/1997 | Walsh et al. | 379/201 |

*Primary Examiner*—Scott Wolinsky

[57] ABSTRACT

A method and apparatus for selectively routing calls between alternate available telephone service providers. The inventive device is operatively connected between a user's telephone instrument and the telephone lines of the various alternate service providers. As the user enters or dials the number representing the intended remote connection, the inventive device analyzes the entered digits. After a sufficient number of digits have been dialed and analyzed, the device automatically chooses the appropriate telephone line over which to send the call, transmits the dialed digits over that line, and connects the telephone instrument to the chosen telephone line.

24 Claims, 3 Drawing Sheets

METHOD AND APPARATUS FOR ROUTING TELEPHONE CALLS BETWEEN ALTERNATE TELEPHONE SERVICE PROVIDERS

FIELD OF THE INVENTION

The present invention is directed to a method and apparatus for enabling a telephone user to select between an available plurality of alternate telephone service providers automatically, as a function of the telephone number dialed.

BACKGROUND OF THE INVENTION

As deregulation of the telephone industry continues, telephone service subscribers are faced with myriad options for local and long distance phone service. For example, new long distance services are being offered which bypass the "local loop," i.e. the traditional tip and ring telephone line provided by the subscriber's local telephone company. Such an alternate service provider can be, for example, the local cable television (CATV) company, which supplies another communication path to the household. This alternate path, generally either fiber optic or coaxial cable, possesses sufficient bandwidth to carry both TV signals and voice and data communications. However, to utilize the alternate cable path, a user must have two instruments, one for "traditional" or local telephone service, and one for the alternate long distance service. It would therefore be greatly advantageous for a user to have a device which would automatically select the proper service without the need for multiple telephone instruments. The present invention provides just such a device.

SUMMARY OF THE INVENTION

The present invention provides an automatic switching and path selection device which automatically determines the appropriate routing of a telephone call based upon the digits dialed by the telephone user.

The inventive device is positioned between the telephone instrument and two alternate communication paths such, by way of a nonlimiting example, as the local telephone loop, which carries the user's local telephone calls, and a CATV line which handles the user's long distance ("LD") calls. As used herein, the terms "telephone instrument" or "telephone" are defined as any device for carrying voice and/or data communication signals. A telephone call, as the term is used herein, may be a voice, data or fax call, or some combination thereof.

For incoming calls, the device senses which of the two incoming lines is ringing, selects between them, and routes the call to the user's telephone, providing ringing current if needed.

For outgoing calls, the device senses the on-hook or off-hook condition of the telephone, receives the dialed digits from the telephone instrument as the user inputs them or dials and, based on the digits dialed, routes the call appropriately to either the local loop or the LD line. The line selection criteria may for example be based, in one particular contemplated application, upon whether the user dials one of a "1" or a "0" at the beginning of the dialing sequence, which typically indicates that a long distance call is being made. The system may also be readily adapted to recognize other initial dialing sequences, such as specific access codes or custom calling features, emergency dialing sequences such as 911, information sequences such as 411, etc. The device may be configured to accept TOUCH TONE™, i.e. Dual Tone Multi Frequency (DTMF) tones, or dial pulses, as required.

In the event of a power failure, the device defaults to the local loop, since most local telephone service providers, are equipped with battery backup and thus continue to provide service during power outages.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING FIGURES

In the drawings, wherein like reference characters denote similar elements throughout the several views.

DESCRIPTION OF THE PREFERRED EMBODIMENTS

Figure 1:
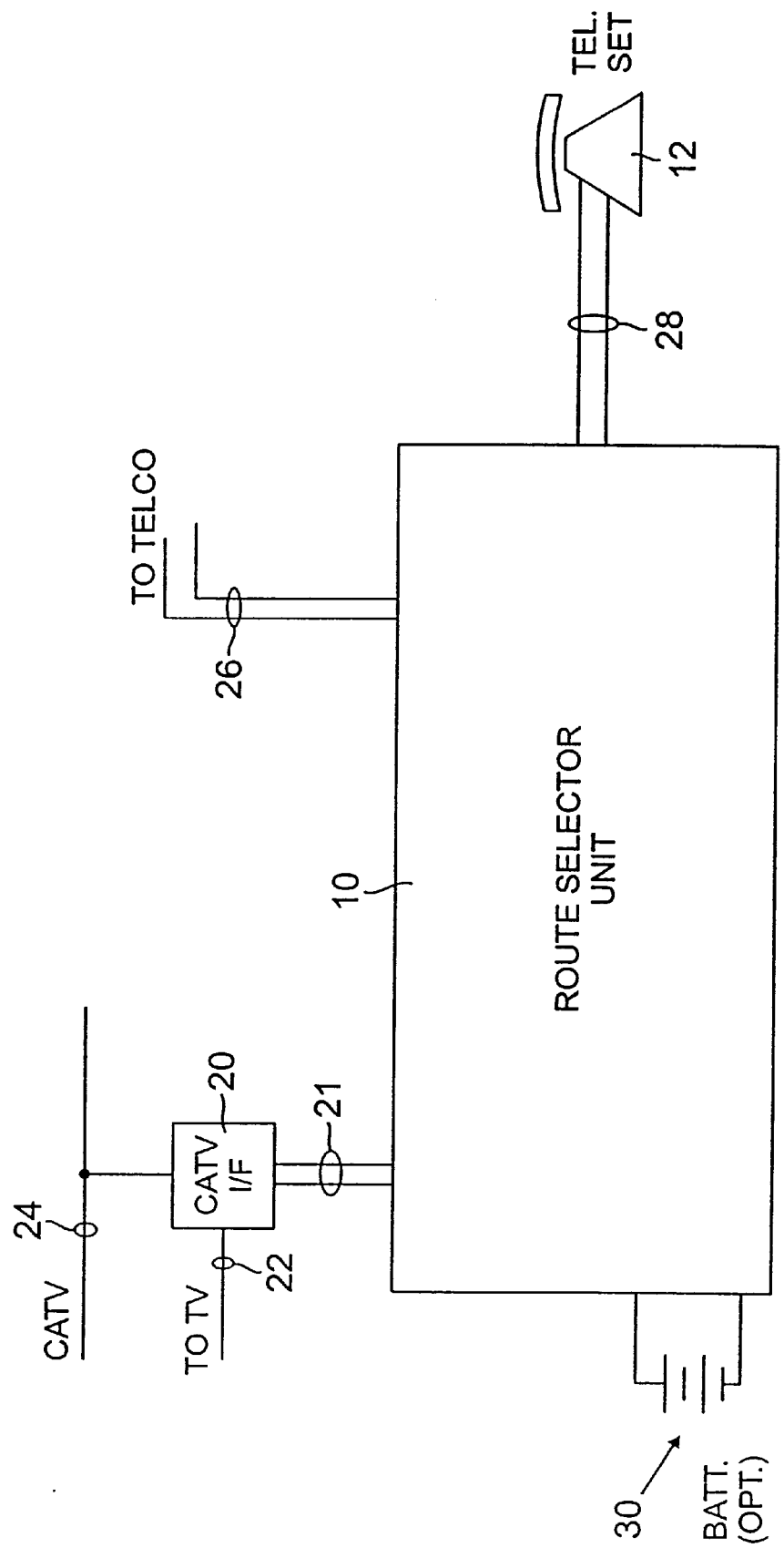
FIG. 1 is a schematic drawing of the route selector unit of the present invention.

With initial reference to FIG. 1, there is depicted a route selector 10 in accordance with the present invention, deployed in a preferred arrangement for routing calls between a user's telephone set 12 through inside telephone line 28 and two alternate services for carrying telephone calls. The first telephone service is provided, for example, by the user's local telephone company via a local loop telephone (telco) line 26, and is utilized for providing local telephone service for handling local telephone calls. As used herein the term local telephone call is defined as those calls that do not require the dialing of an area code or other dialing prefix.

The second, or alternate, telephone service is provided, for example, by the user's CATV provider via alternate telephone line 21. Alternate line 21 in turn connects to a CATV interface 20 which splits the signals carried over cable 24 into telephone signals and television signals. Television signals are sent to the user's TV set via TV cable 22, while telephone calls are sent to the route selector 10 by line 21. CATV interface 20 may be provided by the CATV company or, optionally, may be integrated into the route selector 10. The design and implementation of interface 20 is a matter of design choice well within the skill of the routineer in the art, and accordingly will not be described in detail herein. The route selector 10 may also be equipped with an optional battery 30 for supplying power to the unit in the event of a power failure. The operation of the inventive device during power outages is described in further detail hereinbelow. Additionally, although only one telephone 12 is depicted, the apparatus and its operation as herein described are equally applicable where multiple telephone sets or extensions (not shown) are connected to inside line 28.

Figure 2:
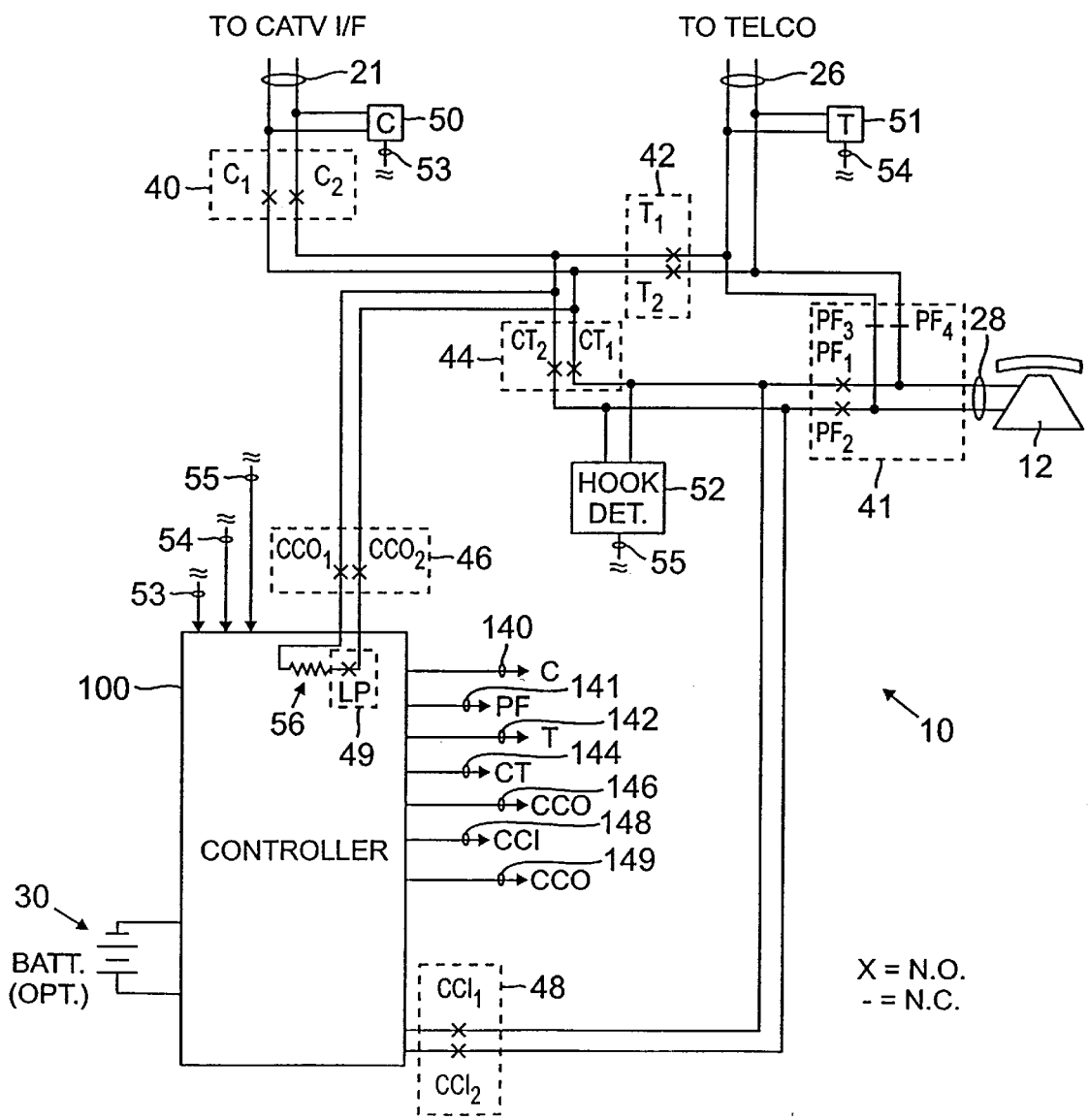
FIG. 2 is a schematic diagram of a preferred switch and control arrangement of the route selector unit of the present invention.
Figure 3:
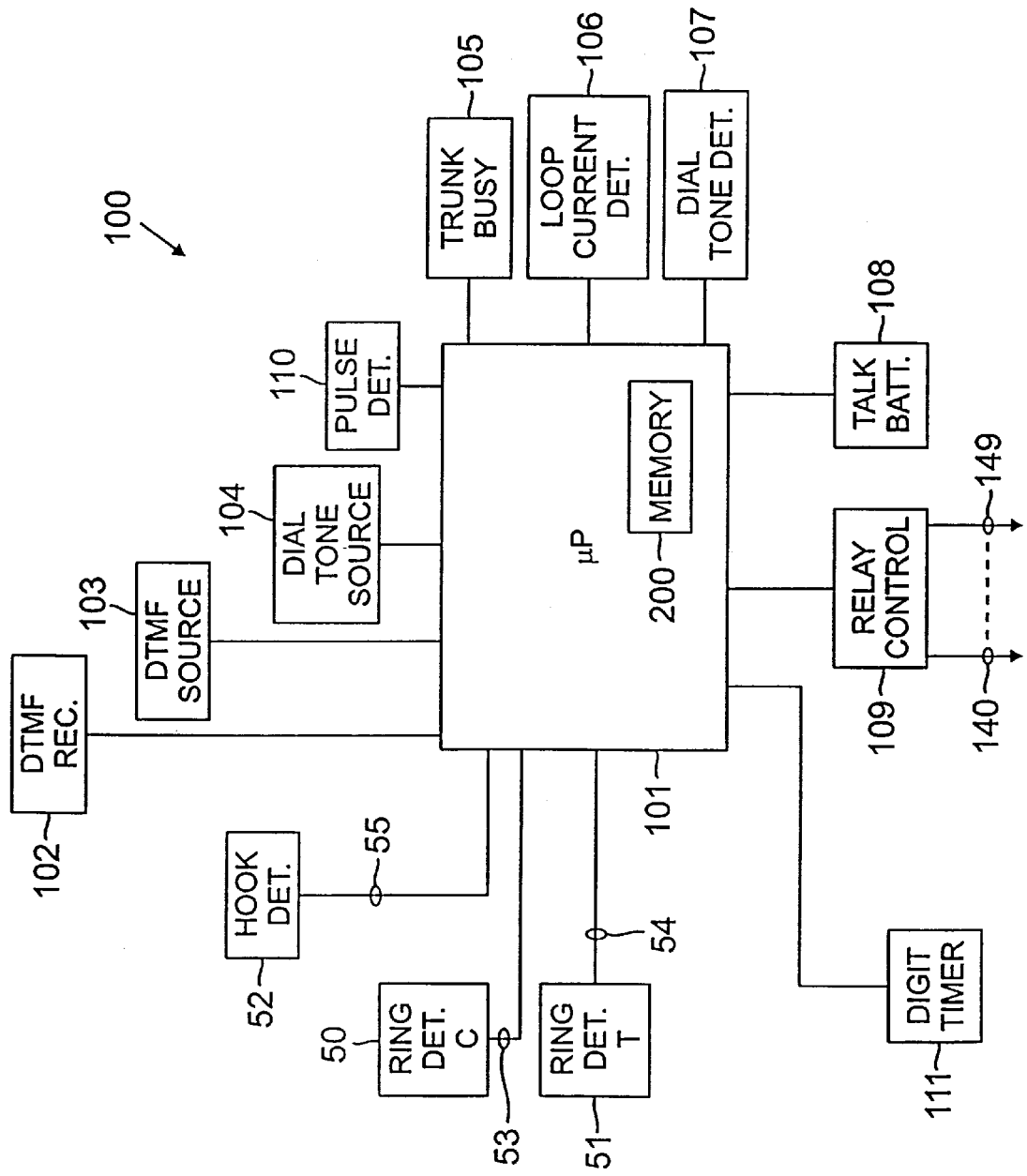
FIG. 3 is a schematic diagram of a preferred arrangement of the controller portion of the present invention.

Referring now to FIGS. 2 and 3, the major functional components of the route selector 10 are schematically depicted. In accordance with standard relay nomenclature, a relay contact point depicted in the drawing figures with an "X" indicates a normally open contact, while a relay contact depicted with an "_" indicates a normally closed contact.

Selector 10 operates under the control by a central controller 100, preferably managed by a microprocessor 101, although discrete transistor, MOSFET, relay logic, and/or other art-recognized logic and switch control methodology may also be utilized. Controller 100 provides switch logic, relay control, telephone line sensing, tone generation and other functions further described below. The terms relay and switch are used herein interchangeably, and are intended to denote any controllable device capable of opening and closing electrical contact points or completing or breaking electrical circuits, such as, by way of non-limiting example, electromechanical relays, transistors, solenoids, MOSFET switches, and their art-recognized equivalents. A relay controller 109, under the direction of microprocessor 101, controls all of the relays in the system via a series of relay control leads numbered 140 through 149. The design and construction of the necessary circuitry to control the relays of the system is considered to be well within the level of skill of the routineer in the art and is not accordingly discussed in detail herein.

Turning first to the operation of inventive device in a power failure condition, or when the selector 10 is switched off by the user, Power Failure (PF) relay 41 reverts to its default state, with contacts PF1 and PF2 open and contacts PF3 and PF4 closed. For this reason PF relay 41 is preferably implemented as an electromechanical relay. In this state, telephone instrument 12 is directly connected to telephone line 26 and operates as a standard telephone set, powered by the telephone company's central office battery in a manner well known in the art.

In the event that the alternate service provided via alternate telephone line 21 is also operational during power outages, the selector 10 may be equipped with an optional battery 30 which permits the selector to operate normally while the optional battery power remains available. Should battery 30 become discharged, then selector 10 reverts to the power failure condition first described above.

When the unit is turned on with operating power available, telephone 12 on hook, and both primary and alternate telephone services connected, the inventive selector 10 operates in the following manner. PF relay 41 is turned on or activated via relay control lead 141 as soon as power is supplied, thereby closing contacts PF1 and PF2 while contacts PF3 and PF4 open. Internal call control relay (CCI) 48 is turned on via control lead 148, closing contacts $CCI_1$ and $CCI_2$ and thereby connecting telephone 12 to controller 100. Hook detector 52, connected to controller 100 via lead 55, continuously monitors the status of telephone 12. Hook detector 52 may be a routine circuit which measures current drawn by the telephone 12; this current is typically approximately 20 milliamps or more when the phone is off hook, and generally less than a few microamps when the phone is on hook. The specific method by which hook status is monitored is a matter of simple, art-recognized design choice, and is not critical to the invention.

In the case of an incoming call on telco line 26, i.e. ring current sent via telco line 26, ring detector 51 alerts the controller 100 via ring lead 54. Controller 100 powers telephone relay (T) 42 via control lead 142, closing contacts $T_1$ and $T_2$, and powers cut through relay (CT) 44 via control lead 144 to thereby close contacts $CT_1$ and $CT_2$. Since, as mentioned above, the PF relay is on while power to selector 10 is on, telco line 26 is directly connected to telephone 12. Telephone 12 rings as a result of the ring current from telco line 26 and, when answered, the call proceeds in a typical manner.

In the case of an incoming call on alternate line 21, i.e. ring current sent via alternate line 21, ring detector 50 alerts the controller 100 via ring lead 53. Controller 100 powers cable relay (C) 40 via control lead 140, closing contacts $C_1$ and $C_2$, and powers cut through relay (CT) 44 via control lead 144 to close contacts $CT_1$ and $CT_2$. Since, as mentioned above, the PF relay is on while power to selector 10 is on, alternate line 21 is thus directly connected to telephone 12. Telephone 12 rings as a result of the ring current received from alternate line 21 and, as above, when answered the call proceeds in the typical fashion. In the event that the cable line 26 carries nothing more than an audio telephone signal, CATV interface 20 would then need to provide talk battery, ring current, etc. in a manner well known in the art.

When controller 100 receives an off-hook condition signal from hook detector 52, and there is no ring detection signal from either of the ring detectors 50 and 51, controller 100 assumes that an outgoing call is being made. With talk battery 108 already connected to telephone 12, controller 100 sends dial tone to telephone 12 via dial tone source 104. As the user begins to dial, DTMF receiver 102 begins to collect the dialed digits or, if telephone 12 is a dial pulse phone, then pulse detector 110 begins to collect the dialed digits. Operation of the system is essentially the same regardless of whether tone or pulse dialing is used, and for the remainder of this discussion DTMF dialing is assumed. In any event, after one or the first several digits are received by DTMF receiver 102, microprocessor 101 analyzes the dialed digits. If the dialed digits do not begin with either a "0" or "1", then the microprocessor assumes that the call is a local call and proceeds to route the call to telco line 26.

To route a local call, controller 100 turns on the T relay 42 via control lead 142 to thereby close contacts $T_1$ and $T_2$, turns on the central office (CCO) relay 46 via control lead 146 to thereby close contacts $CCO_1$ and $CCO_2$, and turns on the loop (LP) relay 49 via control lead 149, completing the telephone loop through resistor 56 and thereby simulating an off hook condition across telco line 26. Resistor 56 is typically 600 ohms, but its exact value may be dependent on the specific line conditions and local loop design; selection of the ideal resistance value is a routine matter of design choice.

Controller 100 then attempts to detect a dial tone on telco line 26 via dial tone detector 107 and, assuming one to be present, passes the dialed digits, now generated by DTMF tone generator 103, to telco line 26. After seven digits have been dialed and passed to telco line 26, controller 100 activates cut through (CT) relay 44 via relay control lead 144, and deactivates the LP, CCI and CCO relays, thus connecting the telephone 12 to telco line 26. The call then proceeds in the normal, art-recognized manner. Since the telephone is directly connected to the telco line, further dialing of digits will not affect the selector 10, and the user may accordingly send DTMF tones to control voice mail systems, speech response systems and the like without difficulty. When the user completes the call and hangs up the phone, hook detector 52 signals controller 100, at which point the T and CT relays are turned off and the CCI relay turned back on, readying the controller for the next call. If the controller 100 does not receive a dial tone on telco line 26, then controller 100 does not pass any digits but instead sends a trk busy signal via trunk busy tone generator 105, thereby indicating to the caller that the call failed for reasons other than a busy condition at the far end.

In the event that during its analysis of the first or first few dialed digits the microprocessor 101 determines that the first dialed digit is a "0" or a "1", then the microprocessor assumes that a long distance call is being made and proceeds to route the call to CATV line 21. However, since the reception of a "0" may also be indicative of a call to the local operator, an interdigit timer 111 is first activated to wait a preselected time, typically several seconds, after which time, if no further dialed digits are received, the call is routed to telco line 26 as an operator call in a manner of the local call as described above.

Assuming, however, that further digits were dialed, then the controller 100 turns on the C relay 40 via control lead 140 to close contacts $C_1$ and $C_2$, turns on the central office (CCO) relay 46 via control lead 146 to close contacts $CCO_1$ and $CCO_2$, and turns on the loop (LP) relay 49 via control lead 149, completing the telephone loop to alternate line 21. The system then attempts to draw dial tone from the CATV system and, if unsuccessful, sends the trunk busy tone described above. If dial tone is successfully obtained, then call processing continues.

Since in long distance dialing the number of digits dialed is frequently variable, the interdigit timer 111 remains active for each digit dialed and the dialed digits are buffered by microprocessor 101. The controller sends dialed digits generated by DTMF source 103 over alternate line 21 one at a time, holding at least one and optionally more dialed digits in reserve as a general matter of design choice. After the predetermined several second timeout period has elapsed with no further digits being entered or dialed, the controller 100 sends whatever digits have remained buffered over alternate line 21, and then connects telephone 12 to alternate line 21 by activating cut through (CT) relay 44 and deactivating the LP, CCI and CCO relays. The call then proceeds in the normal manner described above.

As will be recognized, the inventive system is capable of handling a variety of call variables. For example, microprocessor 101 can be programmed to analyze the digits dialed and route calls containing certain area codes or dialing prefixes or other dialing sequences to one or the other (or still another) phone line or service provider, depending upon and as a matter of selectable user preference. Preferential area codes may be stored, for example in microprocessor memory 200, for comparison by microprocessor 101 with the digits actually dialed. In such an implementation the number of digits that are buffered in microprocessor 101 is suitably increased and no line selection is made until after a sufficient number of digits have been dialed, thereby enabling the performance of digit analysis and comparison in ample time prior to and for determining line selection. Thus, for example, in States or regions with multiple area codes, in-state or in-region calls may be routed to the local telco while out of state or out of region calls are automatically routed to an alternate carrier.

Alternatively, the system of the present invention may be configured or programmed to recognize certain predetermined dialing prefixes which will force the line selection, such for example, as "#1" for local loop calls and "#2" for alternate calls. In the use of pulse dialers, controller 100 may be programmed to recognize "999" or another sequence as the "#" key, and a different dial pulse sequence for the "*" key on a DTMF keyboard, as appropriate or required.

Similarly, the inventive controller may be programmed to recognize predefined digit sequences such as 911, 411, 611, and other special short codes as fully-designated calls which should be passed to the local loop without having the interdigit timer 111 wait for .additional digits. Interdigit timer 111 may also be constructed or configured so as to be adaptive, whereby it will automatically adjust the interdigit wait period in accordance with the speed at which the user generally dials, or when an automatic dialer is used in conjunction with telephone 12.

The various tones generated by the system of the present invention may be generated using any of a variety of suitable methods well within the knowledge of those skilled in the art such, by way of non-limiting example, as a Digital Signal Processor (DSP) with a digital to analog (D/A) converter, discrete circuits, or other art-recognized equivalents. Likewise, tone detection may be performed by a typical DTMF receiver chip, DSP, or other art recognized equivalent.

As will thus be apparent, the call routing system of the present invention may be expanded to select between more than two alternative or complimentary service providers by adding the necessary additional relays and programming the microprocessor 101 accordingly.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An apparatus located at the premises of a user's telephone instrument for automatically routing a telephone call placed by a user employing the telephone instrument, through a selected one telephone service among a plurality of telephone services available to the user, said apparatus comprising:

means for receiving a series of dialed digits of a telephone number entered by the user making the telephone call using the telephone instrument;

means for analyzing said dialed digits so as to determine type of call being placed by the user;

means for simulating an off hook condition of the telephone to said one selected telephone service;

means for detecting a dial tone from said one selected telephone service;

means for transmitting a trunk busy signal to the telephone instrument absent detection of said dial tone by said dial tone detection means;

means for selecting one telephone service of said plural telephone services as a function of the determined call type and for connecting said telephone instrument to said one selected telephone service;

means for preventing said selecting means from connecting said telephone instrument to said one selected telephone service absent detection of said dial tone by said dial tone detection means.

2. The apparatus according to claim 1, further comprising:

incoming call detecting means for detecting an incoming call on one of said plural telephone services; and incoming call connecting means, responsive to said incoming call detecting means for connecting said telephone instrument to said one of said plural telephone services on which said incoming call detecting means has detected a call.

3. The apparatus of claim 2, wherein said analysis means comprises means for identifying at least one of a "0" digit and a "1" digit as a first digit of said entered telephone number for determining the type of call being placed.

4. The apparatus of claim 3, wherein said identifying means further comprises means for identifying a predetermined area code as a part of said entered telephone number for determining the type of call being placed.

5. The apparatus of claim 4, wherein said identifying means further comprises means for identifying a predetermined sequence of dialed digits in said entered telephone number for determining the type of call being placed.

6. The apparatus of claim 5, further comprising means for recognizing a specific sequence of dialed digits in said entered telephone number as a command to select a predetermined specific one of said plural telephone services regardless of said determined call type.

7. The apparatus of claim 6, further comprising power failure connection means for connecting said telephone instrument to a preselected one of the plural telephone services in the event of a power failure.

8. The apparatus of claim 7, further comprising:

means for sensing a hook status of the telephone instrument; and means, responsive to said sensing means, for supplying dial tone to the telephone instrument when the telephone instrument goes off hook.

9. The apparatus of claim 8, further comprising:

means for temporarily storing a variable number of said dialed digits;

means for measuring an interdigit time period between successive ones of said dialed digits as entered by the user; and means for transmitting each of said temporarily stored digits to said one selected telephone service at a predetermined interdigit transmission time interval.

10. The apparatus of claim 9, further comprising:

means for counting the dialed digits entered by the user; and means, responsive to said dialed digit counting means and connected to said selecting means, for delaying the connection of the telephone instrument to said one selected telephone service until a predetermined number of the dialed digits have been entered by the user.

11. The apparatus of claim 10, further comprising:

means, responsive to said interdigit time measuring means, for determining an average time interval between successive dialed digits entered by the user; and means, responsive to said average time interval determination means, for adjusting said predetermined interdigit transmission time interval as a function of said average time interval.

12. The apparatus of claim 11, further comprising:

means, responsive to said interdigit time interval measuring means, for determining that a predetermined fixed time interval has elapsed with no further digits being entered by the user; and means, responsive to said fixed time determining means and connected to said selecting means, for delaying the connection of the telephone instrument to said one selected telephone service until said fixed time interval has elapsed.

13. A method of automatically routing an outgoing telephone call among a plurality of alternate telephone services connected to an automated controller in communication with and located at the premises of a user's telephone, comprising the steps of:

storing a successive plurality of dialed digits for a telephone number entered by a user to place the telephone call through a telephone instrument;

analyzing in the automated controller the dialed digits to determine type a of call being placed;

simulating an off hook condition of the telephone instrument to a selected one of the plural alternate telephone services;

detecting a dial tone on said one selected telephone service;

preventing routing of the outgoing call to said one selected telephone service absent detection of dial tone on said one selected telephone service during said dial tone detecting step;

transmitting a trunk busy signal to the telephone instrument absent detecting of dial tone during said dial tone detecting step;

routing, through automated operation of the controller, the telephone call to said one selected telephone service based upon the determined call type; and connecting, through automated operation of the controller, the telephone instrument to said one selected telephone service.

14. The method of claim 13, further comprising:

detecting in the controller an incoming call on one of said plural telephone services; and connecting the telephone instrument through automated operation of the controller to said one of said plural telephone services on which the incoming call has been detected.

15. The method of claim 13, wherein said analyzing step comprises identifying at least one of a "0" digit and a "1" digit as a first dialed digit of the entered telephone number.

16. The method of claim 15, wherein said analyzing step further comprises identifying a predetermined area code as a part of the entered telephone number.

17. The method of claim 16, wherein said analyzing step further comprises identifying a predetermined sequence of dialed digits in the entered telephone number.

18. The method of claim 17, further comprising recognizing a specific sequence of dialed digits in said interval telephone number as a command to route said outgoing call to a predetermined specific one of said plural telephone services regardless of the determined call type.

19. The method of claim 18, further comprising connecting the telephone instrument to a preselected one of the plural alternate telephone services in the event of a power failure.

20. The method of claim 19, further comprising:

sensing a hook status of the telephone instrument; and supplying dial tone to the telephone instrument when that telephone instrument goes off hook.

21. The method of claim 20, further comprising:

temporarily storing a variable number of said dialed digits;

measuring an interdigit time period between successive ones of said dialed digits as entered by the user; and transmitting each of said temporarily stored digits to said one selected telephone service at a predetermined interdigit transmission time interval.

22. The method of claim 21, further comprising:

counting the dialed digits entered by the user; and delaying the connection of the telephone instrument to said one selected telephone service until a predetermined number of the dialed digits have been entered by the user.

23. The method of claim 22, further comprising:

determining an average time interval between successive dialed digits entered by the user; and adjusting the predetermined interdigit transmission time interval as a function of said average time interval.

24. The method of claim 23, further comprising:

determining that a predetermined fixed time interval has elapsed with no further dialed digits being entered by the user; and delaying the connection of the telephone instrument to said one selected telephone service until said fixed time interval has elapsed.

* * * * *